(No Model.) 6 Sheets—Sheet 6.
W. B. PLACE.
MACHINE FOR ASSEMBLING HEADS OF CARTRIDGE SHELLS.
No. 605,340. Patented June 7, 1898.
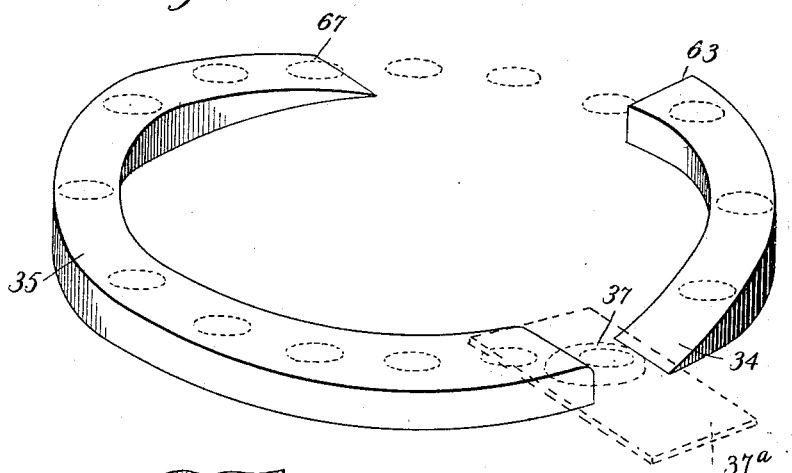
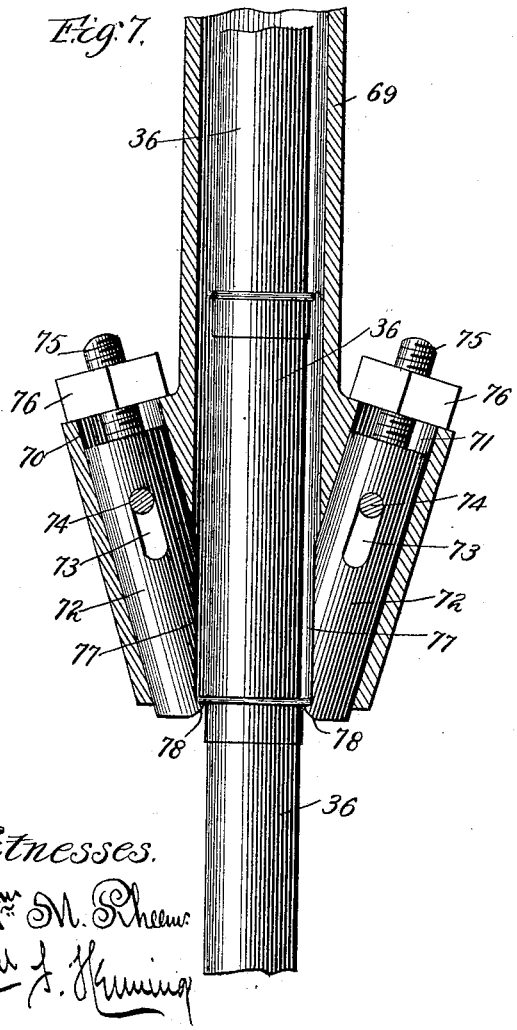
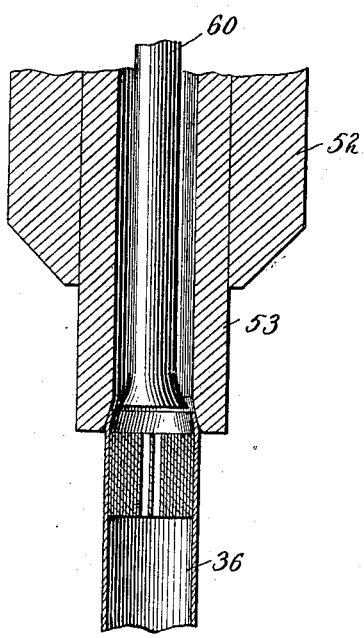

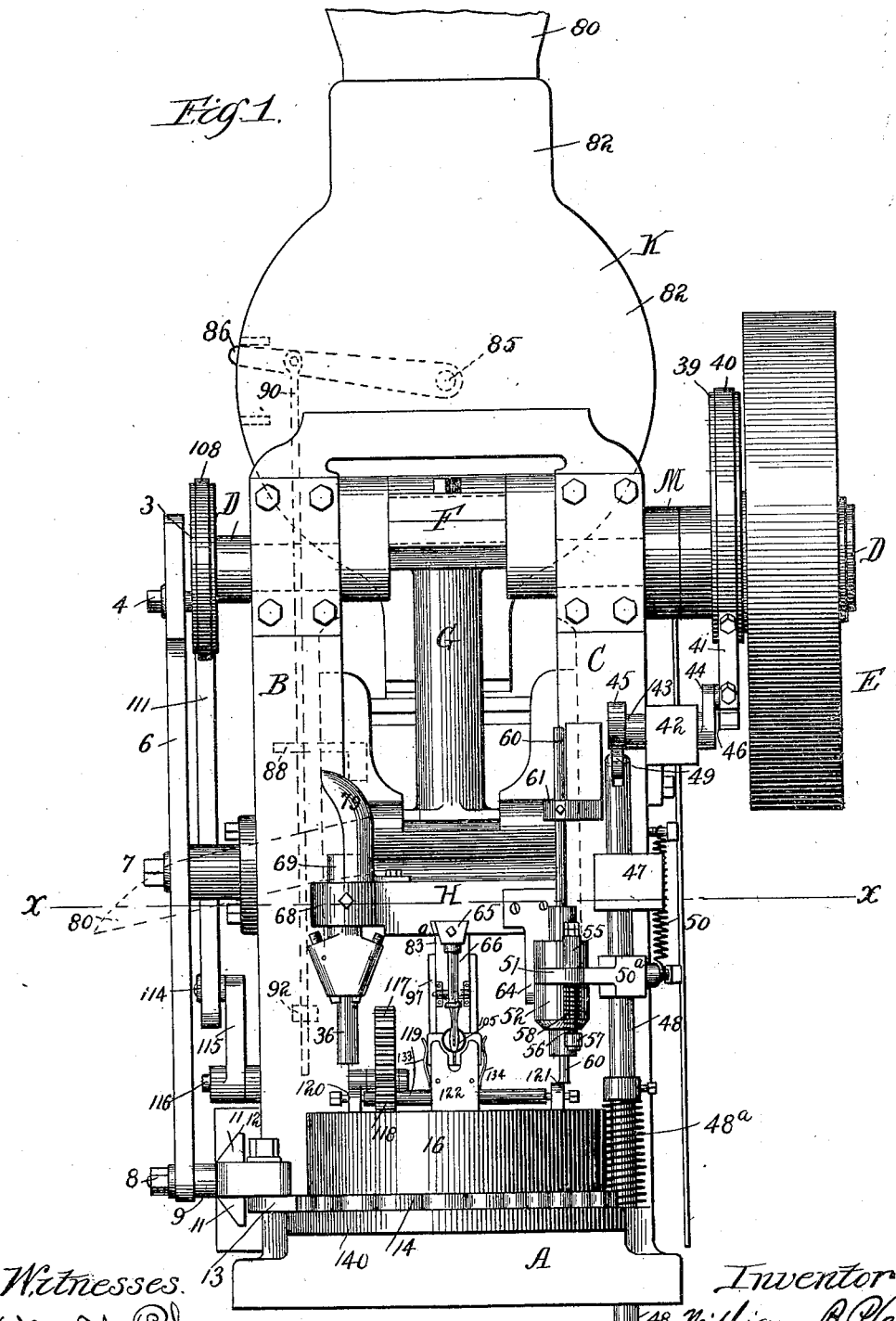

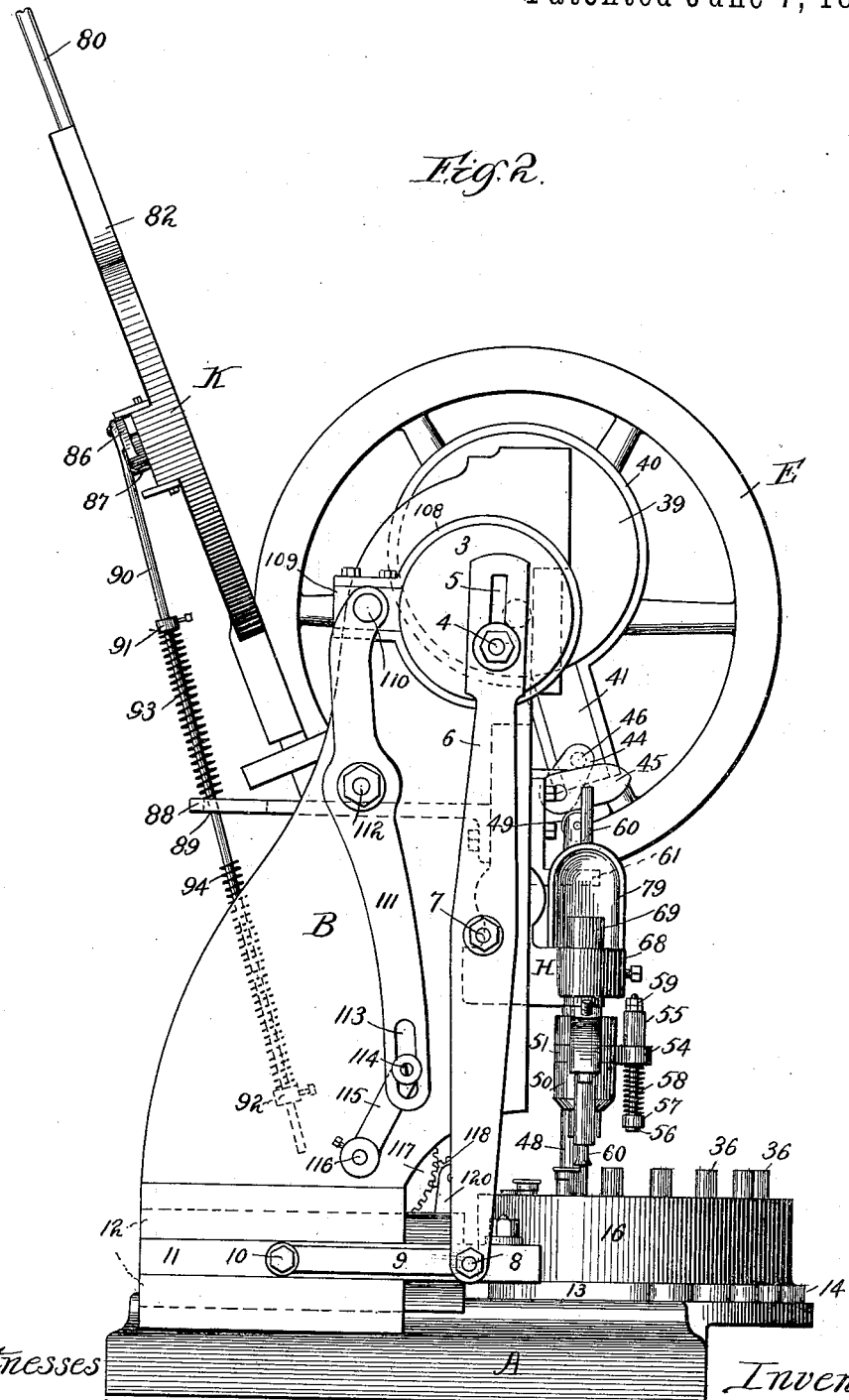

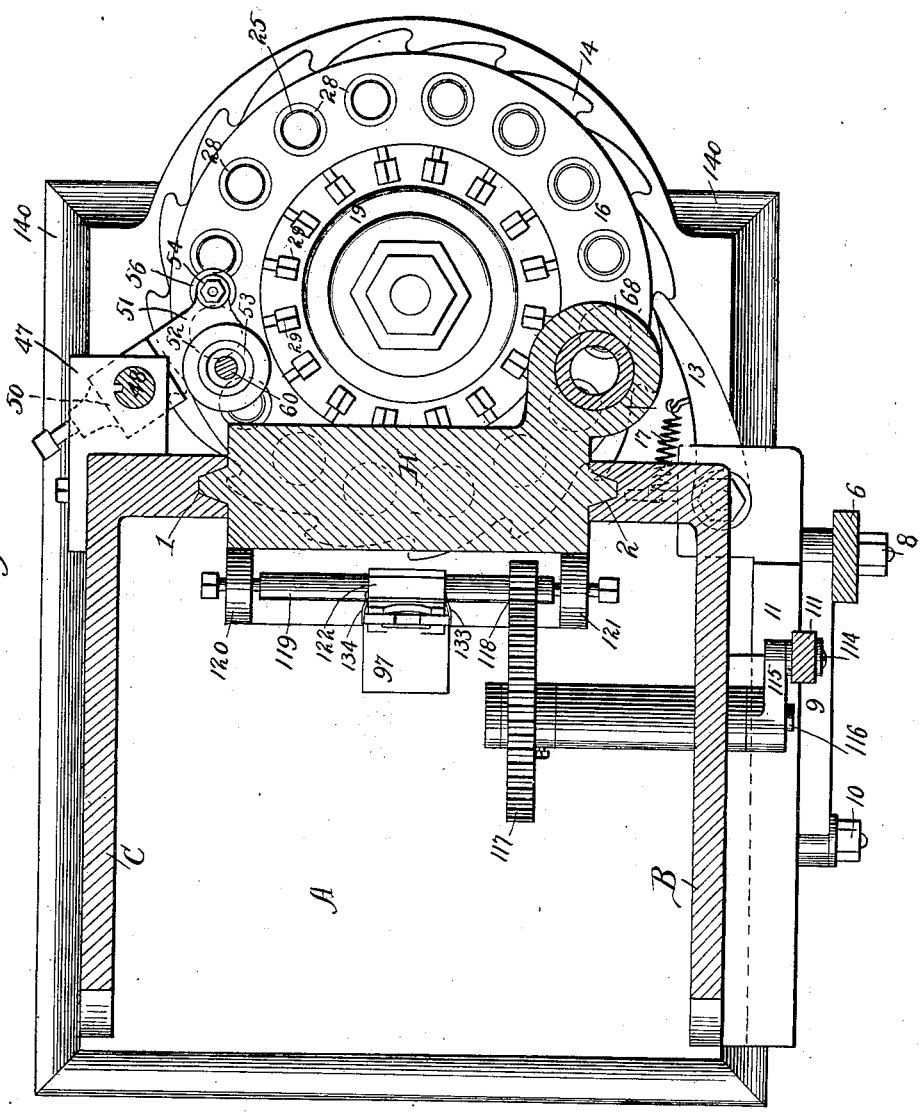

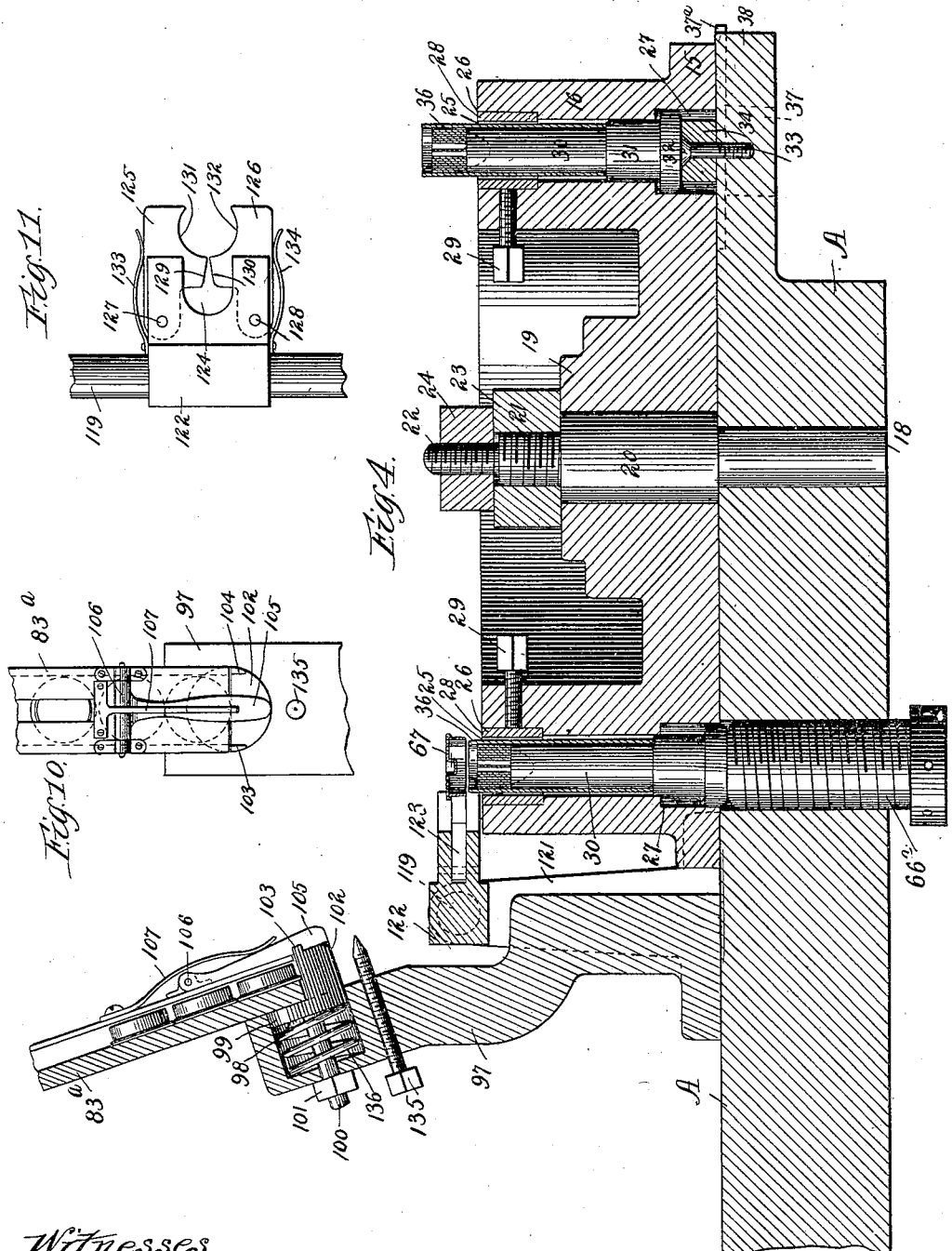

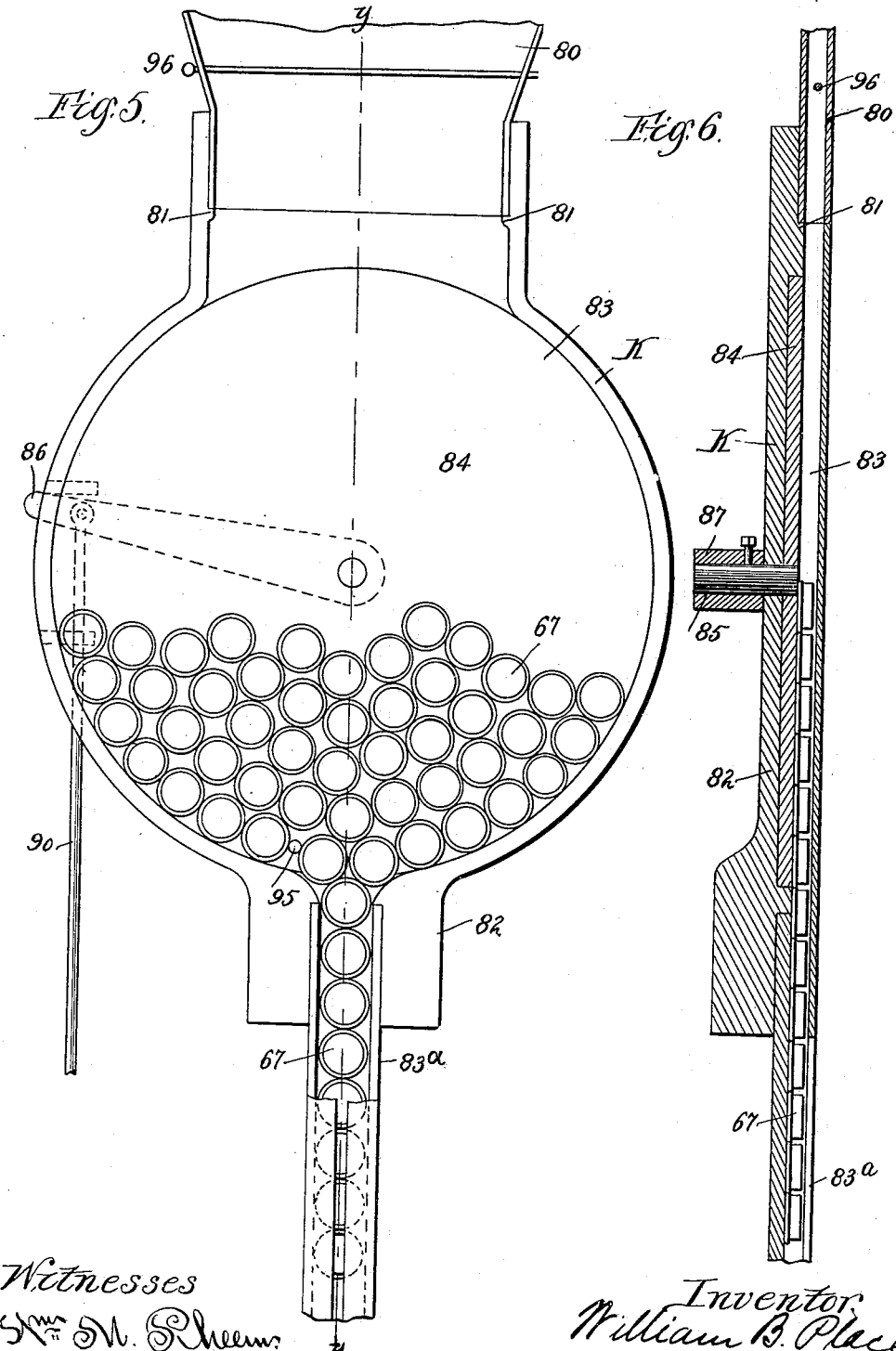

UNITED STATES PATENT OFFICE.

WILLIAM B. PLACE, OF KING'S MILLS, OHIO, ASSIGNOR TO THE PETERS CARTRIDGE COMPANY, OF CINCINNATI, OHIO.

MACHINE FOR ASSEMBLING HEADS OF CARTRIDGE-SHELLS.

SPECIFICATION forming part of Letters Patent No. 605,340, dated June 7, 1898.

Application filed March 26, 1894. Serial No. 505,204. (No model.)

*To all whom it may concern:*

Be it known that I, WILLIAM B. PLACE, a citizen of the United States, residing at King's Mills, in the county of Warren and State of Ohio, have invented a new and useful Machine for Assembling the Heads of Cartridge-Shells, of which the following is a specification.

This invention relates to machinery for use in the manufacture of cartridge-shells; and it has for its object the provision of mechanism for automatically preparing a cartridge-shell and placing a head thereon.

With this object in view the invention consists in the construction, location, and relative arrangements hereinafter more particularly described, as shown in the accompanying drawings, and finally pointed out in the appended claims.

Reference is now had to the accompanying drawings, forming a part hereof, and to the several views and reference letters and numerals appearing thereon, wherein—

Figure 1 is a view in front elevation of my entire machine. Fig. 2 is a view in side elevation of the same, looking from the left of Fig. 1. Fig. 3 is a horizontal sectional view taken on the line $x\ x$, Fig. 1, the head-feeding chute being removed. Fig. 4 is a central vertical sectional view through the shell-turret, showing in central vertical section the lower end of the feed-chute and showing the cartridge-head-transferring device suspending a cartridge-head in position to be forced on the end of a cartridge-shell. Fig. 5 is a view in front elevation of the feeding-chute and agitating-chamber. Fig. 6 is a central vertical sectional view of the same, taken on the line $y\ y$, Fig. 5. Fig. 7 is a detailed view of the mechanism for removing the shells from the turret after the heads have been placed thereon, parts being in section. Fig. 8 is a detailed view in vertical section, showing the action of the crimping-die and stripper. Fig. 9 is a detailed view of the cam for elevating and depressing the shell-holders in the turret. Fig. 10 is a front view in detail of the lower end of the feeding-chute. Fig. 11 is a view in detail of the head-transferring mechanism.

Similar letters and numerals of reference refer to and designate similar parts wherever they occur throughout the several views.

A designates a table or base-plate, which may be suitably supported in any convenient way. Suitably secured to and rising from table A are two standards or castings B C. The main driving-shaft is journaled in suitable boxes formed in or bolted to the upper ends of standards B and C. On the end of shaft D is mounted a drive-wheel E, which is adapted to receive rotary motion from any suitable source of power by belting or otherwise. Any ordinary and conveniently-arranged clutch mechanism M may be employed for throwing shaft D into and out of operation, as occasion may require, and therefore I have not deemed it necessary to show in detail any means for this purpose.

The portion of main driving-shaft D between the two uprights or standards B and C is formed into a crank-arm F. Operated by crank-arm F is a pitman-rod G, which is pivotally connected at its lower end to a plunger-head H, adapted to reciprocate vertically in suitable guideways formed in or bolted to the inner faces of standards B and C, as shown at 1 and 2 in Fig. 3. Plunger-head H carries the head-setting die and the shell extracting or ejecting mechanism, as will more fully hereinafter appear.

On the opposite end of main shaft D from the main drive-wheel E is mounted a plate or disk 3, having a crank-pin 4 projecting from the face thereof, which is adapted to work in a slot 5 in the upper end of a lever 6, pivoted centrally to standard B, as at 7. The lower end of lever 6 is pivoted at 8 to a link 9, which is in turn pivoted, as at 10, to a slide-block 11, sliding in suitable guideways 12 12, formed in or bolted to standard B. In the front end of guide-block 11 is pivotally mounted a pawl 13, adapted to engage ratchet-teeth 14, formed in the periphery of circular flange 15, cast with or secured to the shell-feeding turret 16. (See Figs. 1, 2, and 3.) A spring 17, attached at one end to the pivoted pawl 13 and at the other end to a fixed lug upon the block in which said pawl is pivoted, serves to keep the end of the pawl in constant engagement with the ratchet-teeth 14 and at the same time permits said pawl to ride over the teeth upon its rearward reciprocation after rotating the turret one step on its forward reciprocation. The operation of this part of my machine is as follows: Rotary motion is imparted to main shaft D. The crank-pin 4 in the face of plate 3, operating in slot 5 of lever 6, serves to oscillate or rock said lever about its pivot. The link 9, pivoted to the lower end of said rocking or oscillating lever, reciprocates slide-block 11 back and forth. Upon each forward reciprocation of said slide-block the turret carrying the shells is rotated one step by the engagement with ratchet-teeth 14 thereon of pivoted pawl 13, carried by the slide-block. The rearward reciprocation of said block causes the pawl to ride over the next adjacent ratchet tooth or teeth, as the case may be, into position to rotate the turret another step upon a new forward reciprocation of the block and pawl. By these means the turret carrying the shells is given a step-by-step rotation through a predetermined distance upon each complete revolution of the main shaft, thus presenting the shells successively to the action of the wad-gage, the crimping-die, the head-placer and plunger-setter, and the extractor or ejector, as will be more fully hereinafter explained.

I will now describe the construction of the shell carrier or turret, into which the open-ended shells are fed by an operator and by which they are successively presented to the various mechanisms hereinafter described. Reference is particularly had to Figs. 4 and 8. The turret 16 is provided with a centrally-bored hub 19, adapted to receive a pin or pintle 18, which is supported in a socket in table or base-plate A and about which said turret is adapted to rotate. Pin 18 is provided with an enlargement 20, forming a shoulder which rests upon the top of table A and which is received in the bore of hub 19. The upper end of pin 18 is screw-threaded, as at 21 22, and nuts 23 24 are provided for clamping the turret to the top surface of the table A tight enough to offer sufficient frictional resistance to the rotation of said turret to hold it against rotation until it is acted upon by the pawl mechanism above described. Turret 16 is provided through the rim thereof with a series of perforations or sockets 25, countersunk, as at 26, in the upper face thereof. A bushing 28 is secured in the countersink 26 in the upper end of perforations or sockets 25 by means of bolts 29. Loosely arranged in sockets or perforations 25 are the shell-supporting pins 30, the top portions of which are of a size to snugly fit inside a shell-case, and they are provided with an enlarged portion 31, adapted to fit snugly in the bore or perforation 25 and at the same time form a shoulder against which the end of the shell rests. The lower ends of pins 30 are formed into a head 32, which is received in a groove 27 in the lower face of turret 16 and extending completely around the rim thereof. The perforations 25 communicate with said grooves 27, as clearly shown in Fig. 4. By this construction the case-supporting pins are prevented from being removed from their seats in the turret, except from the under side thereof. Suitably secured to the top of table A, as by pins or screws 33, are circularly-arranged cam-plates 34 35, adapted to be received in the groove 27 in the lower face of the turret. The heads 32 of the case-supporting pins 30 rest upon these cam-plates and are held thereon by gravity, said pins being usually cast solid. The cam-plates serve to elevate or depress the pins in their sockets 25 during the rotation of the turret in order to bring the shells 36 carried thereon into proper elevation to be acted upon by the several mechanisms, as will be hereinafter more particularly described. A perforation may be provided in flange 38 of table A, as at the point 37, Figs. 4 and 9, through which the pins 30 may be removed from the turret by withdrawing a slide-plate 37ª, which covers said perforation, as will be readily understood.

I will now describe the wad-gage and the crimper-die for crimping the end of the shell-case preparatory to receiving a head. On the end of main shaft D, adjacent to the main drive-wheel, is eccentrically mounted a disk 39, adapted to receive an eccentric-strap 40, having a short arm 41 projecting therefrom. In a stationary block or bearing 42, secured or bolted to standard C, is journaled a short shaft 43, having a crank-arm 44 45 on each end thereof. Short arm 41, carried by eccentric-strap 40, is pivoted to a pin 46, carried by crank-arm 44. By reason of the eccentricity of strap 40 a rocking motion is given to the end of the short arm 41, and this motion is imparted through pin 46 and crank-arm 44 to shaft 43, whereby said shaft is rocked or partially rotated back and forth upon each revolution of main shaft D. Adapted to slide vertically through a perforation in a stationary block or bearing 47, bolted or otherwise secured to standard C, is a rod 48. In order to further steady said rod in its vertical reciprocations, its lower end is adapted to pass through a vertical perforation in base-plate or table A, and a spring 48ª is coiled around said rod between a collar thereon and the top of the table A. (See Fig. 1.) The upper end of said rod is arranged in the path of oscillation of crank-arm 45 on shaft 43, said crank-arm thus acting as a cam to force arm 48 in a downward direction. A friction-roller 49 may be provided to reduce the friction of contact between crank-arm 45 and the upper end of rod 48. A strong spring 50, attached at one end to a stationary part of the framework and at the other end to a reciprocating part of rod 48, resists the action of cam-arm 45 and tends to elevate rod 48 into constant contact with said cam-arm. Rod 48 carries a block 50ª, adjustably collared thereon to reciprocate therewith, which is provided with a perforated flange 51. In one of the perforations in said flange is carried a hollow sleeve 52, in which is suitably supported the crimping-die 53. A projecting portion 54 of said flange is also perforated and is adapted to support in said perforation a sleeve 55, in which is supported the wad-gage 56. Upon the lower end of the wad-gage 56 is a collar 57, and interposed between said collar and the under face of projecting portion 54 of flange 51 and coiled around the wad-gage is a spring 58. Upon the upper end of wad-gage 56 are adjusting-nuts 59, by which the amount of projection of the wad-gage is determined, and hence the position to which the wads are gaged in the shells may be regulated. The action of spring 58 is to permit the gage to yield against excessive pressure on the wad in the shell and thus avoid injury in case the shell-supporting pin, and consequently the shell, is out of its normal position when brought underneath the gage during the rotation of turret 16. A rod 60 is adjustably held in a bracket 61, suitably secured to standard C. This rod projects downwardly through the hollow crimping-die 53. (See Figs. 1, 3, and 8.) The lower end of the crimping-die is flared into a conically-shaped mouth, and when the die descends the end of the shell is received therein and is crimped, as clearly shown in Fig. 8. The object of rod 60 is to strip the shell from the crimping-die when said die is elevated should the shell adhere thereto by frictional contact. The operation of this part of the machine is as follows: Suppose the parts be in the position shown in Fig. 1, with a shell in position to be acted upon by the wad-gage. Main shaft D is thrown into operation, and the plunger-rod 48, carrying the gage and crimping-die, is forced down by cam-arm 45 on a shaft 43 by the rocking of said shaft through its connection with eccentric-strap 40. The end of the gage enters the open end of the shell carried by the turret and forces the wad therein down to the necessary point, where it will not be injured by nor interfere with the operation of the crimping-die. Further revolution of the main shaft rocks shaft 43 in the opposite direction, thus relieving the pressure of cam-arm 45 on the upper end of plunger-rod 48, allowing spring 50 to elevate said rod and with it the gage and crimping-die. During this elevation of the rod 48 the pawl-and-ratchet mechanism operates to further rotate turret 16, so as to bring the shell-case into position to be operated upon by the crimping-die. Another revolution of shaft D causes rod 48 to be forced down, and the crimping-die receives and crimps the end of the shell. The rod 60 strips the shell from the crimper when said crimper is again elevated should the shell stick thereto. The cam-plate 34 is so shaped as to afford a firm base or support for the shell-supporting pins 30 during the action of the gage and crimping-die. Upon further rotation of the turret the point 63 of cam 34 is reached, and the pin carrying the shell is allowed to drop by gravity down into its socket 25 until the top or crimped end of the shell comes very nearly flush with the top face of the turret for a purpose presently to be described.

It is desirable to have the shell-supporting pins 30 drop back into their sockets as soon as they ride off the end of cam-plate 34 at the point 63, Fig. 9, in order that they may properly present the crimped ends to the head transferring and setting devices. To avoid the possibility of the pins wedging so as not to descend by gravity, I mount a pusher 64 on the reciprocating head H, which acts to push the pins and crimped shells carried thereon fully home in their sockets before they reach the head-placer and die. By this means I avoid the possibility of injuring the shell-case by the setting-die coming in contact therewith, while its crimped end projects abnormally above the top surface of the turret.

In the lower face of die H is formed a dovetailed guideway adapted to receive a dovetailed block 65, in which the shank of the head-setting die 66 is adjustably held. (See Fig. 1.) This die is adapted to engage a cartridge-head 67, held in place immediately over the crimped end of a shell by the transferring device, and force the same firmly and securely onto the end of said shell. (See Fig. 4.) In order to provide a firm support for the shell-supporting pin to resist the action of the head-placing die, I provide a screw-threaded bolt 66ª, adapted to be received in a screw-threaded socket in table A and to support the shell-supporting pins during the action of the placing-die, as clearly shown in Fig. 4. Upon further rotation of the turret the shell-holding pins reach the point 67 of cam 35 and begin to ride up its inclined surface, thus causing the headed shells to project above the surface of the turret (see Fig. 2) in position to be grasped by the extractor mechanism and removed from the machine. I will now describe the construction of the mechanism for accomplishing this purpose.

In a perforated lug 68, cast with or secured to reciprocating head H, is adjustably held a hollow sleeve 69. This sleeve is enlarged at its lower end, and in said enlargement is provided two oppositely-inclined passages 70 71, one on each side, communicating with the interior of said sleeve. Carried in each of these inclined passages is a solid circular block 72, slotted, as at 73, to receive a pin 74, carried by a bolt 75, screw-threaded at its upper end to receive an adjusting-nut 76, adapted to support and adjust said bolts and block, as clearly shown in Fig. 7. The inner or opposing faces of blocks 72 are beveled off, as shown at 77, and the lower end of each is provided with a hook or shoulder, as at 78, and on the extreme lower end is beveled, as clearly shown. When plunger-head H descends, the beveled lower faces or ends of blocks 72 strike the rim of the head on the end of the shell, and said blocks are forced upwardly as the plunger-block descends still farther. By reason of the oppositely-inclined passages in which said blocks are carried their lower ends are gradually forced apart until the shoulders 78 ride over the cartridge-heads. The slots 73 permit the blocks to move upwardly without disturbing supporting-bolts 75. When the shoulders 78 ride over the head of the shell, the blocks 72 descend by gravity into position for the shoulders or hooks 78 to grasp the rim of the head when the plunger-head H moves upwardly, and thus extract the headed shell from its seat on the carrying-pin in the feeding-turret and hold it suspended by its head, as shown in Fig. 7. Upon the next reciprocation of the plunger-head the lower end of the suspended shell comes in contact with the head of the next shell in the turret and is forced upwardly in the sleeve 69 and is supported therein by the new shell, which is held suspended by its head between the hooks or shoulders on blocks 72 72. Upon further reciprocation of plunger-head H and the extraction of other shells from the turret the first shell is forced still further upwardly through said sleeve and out the upper end thereof, where it strikes an inclined mouthpiece 79, which causes it to fall into a chute 80 (shown dotted in Fig. 1) and from thence into a suitable receptacle.

It will be readily seen from the construction described that if for any reason a head is not supplied to the shell—as, for instance, should the head-transferring device fail to act properly or the supply of heads become exhausted in the feeding-chute, presently to be described, or for any other reason—the extractor will not extract that shell from its seat in the turret, for it is only by the hooks or shoulders 78 78 in blocks 72 72 grasping the rim of the head that it is possible to extract the shells. It will also be seen that upon each reciprocation of the plunger-head a headed shell is extracted should the heading mechanism operate properly.

I will now describe the head-feeding chute for delivering the heads singly to the head-transferring device, presently to be described.

I designate the feed chute or hopper generally by the letter K. This chute is constructed in two parts, the upper part being removable and adapted to be received telescopically in the upper mouth of the lower section, where it is held by shoulders 81, as clearly shown in Figs. 5 and 6. The lower section 82 is stationarily held by being suitably bolted to the framework of the machine and is provided with an enlarged chamber 83, preferably circular in form. The front and back plates forming the sections of the chute are spaced a distance apart equal to the depth of a cartridge-head. The lower portion of section 82 is formed with or adapted to receive the upper end of a raceway 83ª, constructed of a size adapted to receive a single column of heads from the chamber 83, the lower part of chamber 83 being provided with an opening or passage-way just large enough to permit the heads to pass singly therethrough into the raceway 83ª. In order to facilitate the feeding of the heads singly from chamber 83, I mount therein a plate or disk 84, held rigid upon the end of a supporting-pin 85, which is journaled centrally in the rear plate of portion 82 of the feed-chute. A crank-arm 86, having a hub 87, is sleeved on the rearwardly-projecting end of said pin. Projecting rearwardly from plunger-head H and adapted to reciprocate vertically therewith is an arm 88, perforated in its outer end, as at 89, Fig. 2. A rod 90, loosely attached at its upper end to crank-arm 86, is adapted to pass through the perforation 89 in arm or bracket 88. On each side of bracket 88 a collar 91 92 is adjustably secured to rod 90, and a spiral spring 93 94, coiled around the rod 90, is interposed between each collar 91 92 and bracket 88. The operation of this part of the machine is as follows: When plunger-head H is reciprocated, it carries with it bracket 88, which, coming in contact with spring 93 on rod 90 in its upward reciprocation, compresses said spring against collar 91 until the weight and friction of the several parts affected thereby are overcome, thus elevating rod 90, and consequently raising crank-arm 86 and rotating pin 85, and with it plate or disk 84, against a yielding resistance. Upon a downward movement of arm 88 spring 94 is engaged and compressing against collar 92 yieldingly forces rod 90 downwardly, thus rocking arm 86, and consequently disk 84, in the opposite direction. This constant alternate rocking back and forth of disk 84 agitates the heads in chamber 83, thus preventing the mouth of the raceway 83ª from becoming choked up and assisting the feed of the heads singly into said raceway. To still further assist in this work, I provide a pin 95 (see Fig. 5) in the face of disk 84, adjacent to the passage therein leading into the raceway, which when said disk is rocked back and forth moves the heads contained in chamber 83 at the point where they begin to feed into the raceway, thus crowding and forcing the heads singly into the raceway.

The upper or removable part of the feed-chute is removed from the machine and is filled by an operator with cartridge-heads, all of said heads being placed therein with the cup part thereof pointing toward the front. A small rod 96, passing through suitable perforations in the edges of said portion near its lower end, serves to support the heads therein until said lower end is telescoped into the upper end or mouth of the portion 82, when said rod 96 is withdrawn, allowing the heads to slide down into the chamber, and the raceway being just sufficient to accommodate a head therein the possibility of the heads being turned in the wrong direction after having been started in properly is entirely avoided.

The lower end of raceway 83ª is supported in a standard 97, rising from base-plate A, (see Fig. 4,) and the upper end of standard 97 is provided with a chamber 98, adapted to receive a bolt 99, having a reduced shank 100, adapted to pass through a perforation in standard 97. An adjusting-nut 101 is provided on the end of said shank. Bolt 99 is cut away upon the upper side thereof, leaving a projecting half 102, having a flat upper surface. This projecting portion is adapted to be projected across into the path of raceway 83ª immediately adjacent to the lower end thereof and in fact forms the support for the column of heads contained in said raceway, the lowermost head resting against the flat upper surface of projecting portion 102 of bolt 99. A spring 136, located within chamber 98, bearing at one end against the wall of said chamber and at its opposite end against the rear face of bolt 99, tends to keep said bolt normally projected across the lower end of the raceway, the amount of projection being regulated by nut 101. Upon the front end of projecting portion 102 are formed ribs 103 104. (See Figs. 4 and 10.) The head-transferring device, presently to be described, upon being thrown up into a vertical position strikes the ribs 103 and 104 and forces bolt 102 back into its receiving chamber or socket, thus permitting a cartridge-head to fall down into position to be grasped by the transferring device. A lip or tongue 105 is pivoted, as at 106, to raceway 83ª to assist in holding and steadying the cartridge-head while being grasped by the transferring device. A spring 107 bears against said pivoted lip and tends to press the same against the end 102 of block 99, as clearly shown in Fig. 4.

I will now describe the mechanism for transferring the cartridge-heads from the lower end of the raceway or feeding-chute into position to be placed on the end of a shell. Disk 3, heretofore referred to, is mounted eccentrically on shaft D and has mounted thereon a strap 108, having a short arm 109. A lever 111, pivoted intermediate to its ends, as at 112, to standard B, is pivoted at its upper end to a pin 110, carried by arm 109. The lower end of the lever 111 is slotted, as at 113, and receives in said slot a pin 114, carried by a crank-arm 115, adjustably sleeved on the end of a short shaft 116, having bearings in standard B. A gear-wheel 117 is mounted on the other end of shaft 116, so as to be capable of angular adjustment thereon. Gear-wheel 117 is adapted to mesh with a small gear-wheel 118, mounted upon a shaft 119, suitably journaled in lugs 120 121, projecting upwardly from the table or base-plate. Mounted on shaft 119 or cast solid therewith is a block 122, slotted, as at 123, and cut away, as at 124. Jaws 125 126 are pivoted in the slot 123 in block 122, as at 127 128. These jaws 125 126 are provided on their meeting edges with flanges 129 130, beveled away from each other, as shown in Fig. 11. The meeting edges of jaws 125 126 are also correspondingly cut away, as at 131 132, to form an opening of a size adapted to receive and grasp a head. Springs 133 134 serve to press said jaws constantly toward each other. Through standard or bracket 97 projects a pointed screw 135, so located that, when block 122 is thrown up into position to receive a head from the raceway, the point thereof enters the V-shaped opening formed by the beveling of the flanges 129 130, and thus forces said jaws against the action of springs 133 134, so as to receive a cartridge-head in the grooves 131 132, the cut-away portion of the block 122, as at 124, permitting the screw 135 to reach the flanges on the clamping-jaws. The screw 135 is adjustable in order to regulate the amount of its projection. Block 122 is so located on a shaft 119 that when it is thrown up by said shaft it will be in a position to receive a cartridge-head from the raceway 83ª, and when thrown down into a horizontal position it will hold the cartridge-head immediately over the crimped head of a shell and ready for the action of the placing-die. (See Fig. 4.) The operation of this part of the machine is as follows: Rotary motion is imparted to the shaft D, which is imparted to eccentric-disk 3, and this in turn reciprocates the short pitman 109, and consequently racks or oscillates lever 111 about its pivot 112. This oscillating or racking movement is transmitted to shaft 116, and consequently to gear 117, through the crank-arm 115 and the pin thereon, working in slot 113 in the lower end of lever 111. The relative sizes of gears 117 and 118 are so proportioned that upon each complete oscillation of said gear 117 the gear 118, meshing therewith, is rotated a little more than a quarter-revolution in one direction and then back again. This rotation, transmitted to shaft 119, throws clamping-block 122, which forms the head-transferring device, upwardly, where it receives a cartridge-head, and back to its horizontal position to place the head in position to be forced on the crimped end of a shell. When said block is thrown upwardly, the pointed end of screw 135 forces jaws 125 126 open against the action of springs 133 134. The plunger-bolt 99 is forced back into its socket or chamber 98 against the action of spring 136, thus permitting the lowermost head to fall into the grooves 131 132 in the clamping-jaws 125 126, said head being prevented from falling out by pivoted tongue 106. When block 122 begins its return movement, spring 136 forces the plunger-block forwardly into position to sustain the column of heads in raceway 83ª and springs 133 134 force jaws 125 126 together to grasp and clamp the head when relieved from the point of screw 135.

In order to catch and hold the drippings of oil from the machine, I provide a tray 140, extending around the top of table or base-plate A.

In order that rod 48 may reciprocate truly in a vertical line and be prevented from turning, I provide a longitudinal groove therein adapted to receive a feather or spline carried by block 47, as clearly shown in Fig. 3.

While I have shown and particularly described a preferred form of mechanism for carrying out the principles of my invention, it is obvious that many changes, modifications, and alterations may be made in the details of construction, location, and arrangement without departing from the spirit or scope of my invention. I therefore do not desire to be understood as limiting myself to the exact details shown and described; but What I do claim as my invention, and desire to secure by Letters Patent of the United States, is—

1. In a machine of the class described, a plunger-head, a head-setting die carried thereby, a plunger-rod, a shell-crimper carried thereby, shell feeding and extracting devices, means for reciprocating said plunger-head and means for reciprocating said plunger-rod independently of the reciprocations of the plunger-head, as and for the purpose set forth.

2. In a machine for placing heads on cartridge-shells having the wads previously inserted therein, a reciprocating plunger-head, a head-setting die carried thereby, shell-case feeding and extracting devices, and means for actuating these several parts, in combination with an independent plunger, a gage carried thereby and arranged to gage the depth of the wads in the shell-cases in advance of the action of the head-setting die and means for reciprocating the said independent plunger, as and for the purpose set forth.

3. In a machine of the class described, a driving-shaft having an eccentric disk mounted thereon, a strap for said disk, a plunger-rod, a crimping-die carried thereby, means operated by said eccentric-strap for moving said rod and a yielding resistance against which said rod is moved and adapted to return the same, as and for the purpose set forth.

4. In a machine of the class described, a plunger, a shell-crimping die carried thereby, yielding means for normally keeping said plunger elevated, means for periodically advancing said plunger against said yielding resistance, a head placing and setting mechanism, and shell extracting and feeding devices, all combined and arranged as and for the purpose set forth.

5. In a cartridge-shell-head-assembling machine, a plunger-head, carrying a head-setting die and a shell-extractor a rod independent of said plunger-head, a crimping-die carried thereby, a shell-feeding mechanism and means for independently operating said plunger head, rod and feeding mechanism, as and for the purpose set forth.

6. In a machine of the class described, a plunger-rod, a shell-crimping die carried thereby, devices for moving said plunger in one direction to its work and a yielding resistance arranged to oppose said movement and normally acting to return said plunger, a plunger-head carrying a setting-die, a shell-extractor and a shell-feeding mechanism, all combined and arranged as and for the purpose set forth.

7. In a cartridge-head-assembling machine, a grooved, reciprocating plunger, a crimping-die carried thereby, a stationarily-held feathered box through which said plunger reciprocates, means for reciprocating said plunger, and cartridge-shell-feeding mechanism, all combined and arranged as and for the purpose set forth.

8. In a machine of the class described, a reciprocating plunger-head, shell-extracting and head-setting mechanisms carried thereby, a plunger-rod, shell-crimping mechanism carried thereby, and means for moving said plunger-rod independently of the reciprocations of the plunger-head, and a yielding resistance against which said rod is moved, as and for the purpose set forth.

9. In a machine of the class described, a plunger, a block adjustably supported by said plunger, a shell-crimping device carried thereby, means for moving said plunger, a yielding resistance against which said plunger is moved, shell feeding and extracting devices and head placing and setting mechanism, all substantially as and for the purpose set forth.

10. In a machine of the class described, a plunger, a block adjustably carried thereby, a crimping-die and a wad-gage carried by said block, reciprocating head-setting and shell-extracting devices, shell-feeding devices and means for moving said plunger against a yielding resistance independent of the reciprocations of the head setting and extracting devices, as and for the purpose set forth.

11. In a machine of the class described, a plunger adapted to be periodically moved against a yielding resistance, a crimping-die and a wad-gage adjustably carried thereby, and means for securing a yielding motion of said gage, as and for the purpose set forth.

12. In a machine of the class described, a plunger adapted to be moved periodically against a yielding resistance, a block adjustably carried thereby, a crimper-die carried by said block, a wad-gage yieldingly supported by said block, all in combination, as and for the purpose set forth.

13. In a machine of the class described, a plunger, a hollow crimper-die carried thereby, a shell-stripper stationarily held and adapted to be projected longitudinally through said hollow die and means for moving said plunger positively in one direction and a spring arranged to return said rod to its normal position, as and for the purpose set forth.

14. In a machine for placing heads on cartridge-shells having the wads previously placed therein, a reciprocating plunger-head, a head-setting die carried thereby, means for reciprocating said plunger-head, a shell crimper and stripper arranged in advance of the head-placing mechanism, an independent reciprocating plunger, a wad-gage carried thereby and adapted to gage the depth in the shells of the wads previously placed therein, means for actuating said independent plunger, and shell-extracting mechanism, all combined and arranged as and for the purpose set forth.

15. In a machine of the class described, a short shaft journaled in a stationary bearing and having a crank-arm on each end thereof, means connected with one of said crank-arms for rocking said shaft, a plunger adapted to be moved by the other of said arms against a yielding resistance, a crimping-die and a wad-gage carried by said plunger, all combined and arranged as and for the purpose set forth.

16. In a machine of the class described, a main shaft, an eccentric mounted thereon, an eccentric-strap mounted on said eccentric and provided with a pitman, a spring-supported plunger adapted to slide in a stationary bearing, a rock-shaft journaled in a stationary bearing and provided with a crank-arm on each end thereof, one of said crank-arms connected to said pitman and the other adapted to contact with said plunger and force the same in a direction opposed to its spring-supports, as and for the purpose set forth.

17. In a cartridge-shell-head-assembling machine, the combination with wad-gaging, shell-crimping, head-setting and shell-extracting mechanisms of a shell-feeding mechanism for successively presenting a shell to said several mechanisms, comprising a dial having sockets formed therein and having a continuous groove upon the under side thereof, pins loosely mounted in said sockets, a cam-surface stationarily mounted and arranged to be received in said groove and upon which said pins are supported, whereby when said dial is rotated, said pins are projected or retracted, and means for rotating said dial, as and for the purpose set forth.

18. In a cartridge-shell-head-assembling machine, the combination with a plunger, a wad-gaging device and a shell-crimping device actuated thereby, a reciprocating plunger-head, shell-case-head setting and extracting devices actuated thereby, of means for successively presenting the shell-cases to said several devices, comprising a dial, pins carried thereby and means for projecting said pins and withdrawing the same to properly present the shell-cases, and means for rotating said dial, as and for the purpose set forth.

19. In a cartridge-shell-head-assembling machine, the combination with a plunger, wad-gage and shell-crimping devices carried thereby, and a reciprocating plunger-head, head-setting and shell-extracting devices carried thereby, of means for successively presenting a shell-case to said several devices, comprising a shell-carrier having sockets formed therein, pins loosely mounted in said sockets, cam-plates mounted in the path of travel of said sockets upon which said pins are supported, and means for actuating said carrier, as and for the purpose set forth.

20. In a cartridge-shell-head-assembling machine, the combination with wad-gaging, shell-crimping, head-setting and extracting devices, and means for actuating the same, of means for successively presenting the shells to said several devices, comprising a table, a shell-carrier mounted thereon and having a groove upon the under side thereof, sockets formed through said carrier and communicating with said groove, cam-plates stationarily mounted upon said table and arranged to register with and to be received in the groove in said carrier, pins loosely mounted in said sockets and arranged to rest upon said cam-plates, and means for actuating said carrier, as and for the purpose set forth.

21. In a cartridge-shell-head-assembling machine, the combination with wad-gaging, shell-crimping, head-setting and extracting devices, and means for actuating the same, of means for successively presenting the shell-cases to said several devices, comprising a table, a rotary dial arranged to rest thereon and having a circularly-arranged groove on the under side thereof, peripherally-arranged sockets formed through said dial and opening into said groove, cam-plates stationarily mounted on said table and arranged to project into said groove, pins loosely mounted in said sockets and arranged to rest on and to be supported by said cam-plates, and means for rotating said dial, as and for the purpose set forth.

22. In a cartridge-shell-head-assembling machine, the combination with wad-gaging, shell-crimping, head-setting and extracting devices, and means for actuating the same, of means for successively presenting the shell-cases to said several devices, comprising a table, a carrier arranged to rest thereon and having a groove or recess upon the under surface thereof, sockets formed through said carrier and opening into said groove, fixed cam-plates mounted on the top surface of the said table and arranged to project into said groove, headed pins arranged in said sockets and having the heads thereof arranged in said groove and resting upon said cam-plates, and means for actuating said carrier, as and for the purpose set forth.

23. In a cartridge-shell-head-assembling machine, the combination with wad-gaging, shell-crimping, head-setting and extracting devices and means for actuating the same, of means for successively presenting the shells to the said several devices, comprising a perforated table, a shell-case carrier mounted thereon, said carrier provided with sockets, pins loosely mounted in said sockets, said sockets and perforations being so relatively arranged as to be brought into register with each other when said carrier is suitably actuated, whereby said pins may be inserted in or withdrawn from said sockets, means for closing said perforations, cam-plates arranged in the path of travel of said carrier and upon which said pins are supported, and means for actuating said carrier, as and for the purpose set forth.

24. In a machine of the class described, a plunger, a head-setting die actuated thereby and means for feeding a head, in combination with a table, a shell-feeding device mounted thereon and arranged to present the shells to the action of said setting-die and a stationary support for the shell adjustably mounted in said table and arranged in line with the head-setting die, said support adapted to resist the action of said die, as and for the purpose set forth.

25. In a cartridge-shell-head-assembling machine, a head transferring and placing device, a shaft upon which said device is mounted, a gear-wheel mounted on said shaft and means for operating the same, comprising a rock-shaft, a gear-wheel mounted thereon and meshing with said first-mentioned gear and a rocking-lever for rocking said shaft, as and for the purpose set forth.

26. In a machine of the class described, a head-setting mechanism, a head transferring and placing device, a shaft upon which said device is mounted, a gear-wheel mounted on said shaft, a second gear-wheel meshing with the first-mentioned gear and means for rocking said last-mentioned gear at each operation of said head-setting mechanism, as and for the purpose set forth.

27. In a machine for heading shells in which the wads have been previously placed, the combination with wad-gaging, shell-crimping, head-setting and extracting devices and a main shaft for actuating the same, of a head transferring and placing device and means for actuating the same, comprising a pivotally-mounted lever having connection at one end with said transferring device, an eccentric mounted on said main shaft and connections between said eccentric and the other end of said lever, as and for the purpose set forth.

28. In a machine for heading shells in which the wads have been previously inserted, a head-setting mechanism, a head-transferring device, a shaft for supporting the same, a rock-shaft, intermeshing gear-wheels respectively mounted on said shafts, and means for rocking said rocking shaft at each actuation of said head-setting mechanism, comprising an eccentric and a pivotally-mounted lever, as and for the purpose set forth.

29. In a machine of the class described, a head-setting mechanism, a head-transferring mechanism and supporting-shaft therefor, a rock-shaft, a gear-wheel mounted thereon for angular adjustment and adapted to mesh with a gear-wheel on the first-mentioned shaft and means for rocking said rock-shaft at each actuation of said head-setting mechanism, as and for the purpose set forth.

30. In a cartridge-shell-head-assembling machine, the combination of a reciprocating plunger, a head-setting die and shell-extracting devices carried thereby, means for actuating said plunger, means for crimping the ends of the shell-cases and means for presenting the heads to the said setting mechanism, comprising pivoted jaws having oppositely-beveled meeting projections or flanges and means for engaging said oppositely-beveled flanges for opening said jaws, as and for the purpose set forth.

31. In a cartridge-head-assembling machine, a reciprocating plunger, a head-setting die and shell-extracting devices carried thereby, means for actuating said plunger, a crimper and a wad-gage arranged in advance of said die and means for presenting the shell-cases to these several parts, in combination with means for presenting the heads to the said head-setting die comprising pivoted jaws having oppositely-beveled meeting projections or flanges, springs arranged to normally close said jaws and means for engaging said oppositely-beveled flanges for opening said jaws, as and for the purpose set forth.

32. In a cartridge-head-assembling machine, a reciprocating plunger a head-setting die and shell-extracting devices carried thereby, means for actuating said plunger, a crimper and a wad-gage arranged in advance of said head-setting die and means for successively presenting a shell-case to these several devices, in combination with means for presenting the heads to the action of said setting-die, comprising pivotally-mounted, spring-pressed jaws, having oppositely-beveled meeting projections or flanges, said jaws being cut away on their meeting edges to conform to the shape of the head, and means arranged to engage said oppositely-beveled projections or flanges upon said jaws, as and for the purpose set forth.

33. In a cartridge-shell-head-assembling machine, a shell-crimping device, a head-setting die, a shell-extracting mechanism, means for actuating these several parts, and means for successively presenting the shell-cases to the action of these several devices, in combination with a head-transferring device, comprising pivotally-mounted spring-pressed jaws having oppositely-beveled meeting projections or flanges, and an adjustably-fixed part arranged to enter the space between the beveled meeting edges of said flanges or projections when said jaws are rocked, whereby said jaws are forced apart, and means for rocking said jaws upon their pivotal support, as and for the purpose set forth.

34. In a machine of the class described, a crimper, a head-setting die, a shell-extractor, means for actuating these several devices, in combination with a rocking, head-transferring device comprising pivotally-mounted spring-pressed jaws arranged with the edges thereof opposed to each other, said edges provided with projections or flanges oppositely beveled on the meeting edges thereof, an adjustable pointed screw or pin arranged in the path of movement of said transferring device and adapted, when said jaws are rocked about their pivotal support, to enter the space between the beveled meeting edges of said projections or flanges, whereby said jaws are forced apart, and means for rocking said jaws, as and for the purpose set forth.

35. In a cartridge-head-assembling machine, a shell-crimping device, a head-setting die and a shell-extractor, means for reciprocating these several parts, and means for successively presenting the shells to the action of the several parts, in combination with means for feeding the heads to the said head-setting die, comprising a stationary raceway having a delivery-mouth and adapted to receive the heads in single column, a support for said raceway, a recess formed in said support adjacent to the delivery-mouth of said raceway, a yieldingly-mounted block arranged in said recess and normally held across the delivery-mouth of said raceway, and a head-transferring device arranged, when actuated, to displace said block from across the delivery-mouth of the said raceway, whereby the heads are permitted to pass singly from said raceway to said head-transferring device, and means for actuating said head-transferring device, as and for the purpose set forth.

36. In a machine of the class described, a feeding-chute comprising a stationary chamber having a mouth, a removable tray adapted to receive the articles to be fed and to be telescoped into the mouth of said stationary chamber to deliver the articles therein, means for supporting the movable part in the mouth of said stationary part and means arranged within said chamber for agitating the heads contained therein, as and for the purpose set forth.

37. In a machine of the class described a feeding-chute, comprising a chamber, means for delivering the heads to said chamber with their open ends all presented in one direction, a raceway communicating with said chamber, a disk arranged in said chamber and means for rocking or agitating said disk, whereby the heads are prevented from clogging the mouth of said raceway, as and for the purpose set forth.

38. In a machine of the class described, a head-feeding chute comprising an enlarged chamber, a raceway communicating with the lower part of said chamber and a rocking disk mounted in said chamber and provided with a pin in the face thereof, and means for rocking said disk, as and for the purpose set forth.

39. In a machine of the class described, a feeding-chute comprising a chamber, a receiver communicating with said chamber, an agitating-disk arranged in said chamber, a reciprocating plunger and yielding connections between said plunger and disk for yieldingly rocking the latter, as and for the purpose set forth.

40. In a machine of the class described, a feeding-chute, an agitating-disk arranged to rock therein, a reciprocating plunger and yielding connections intermediate said plunger and said disk for rocking the latter, as and for the purpose set forth.

41. A head-feeding chute having an enlarged chamber, a rocking disk mounted therein, a crank-arm sleeved on the disk-support, a rod connected to said crank-arm, a reciprocating plunger, a perforated arm carried thereby, said rod adapted to pass through said perforation and springs interposed between said arm and collars on said rod, as and for the purpose set forth.

42. In a head-feeding device, a raceway adapted to receive a single column of heads, a slidable spring-pressed plunger normally held transversely across the mouth of said raceway and adapted to support said column of heads and a transferring device arranged to periodically engage said support and slide the same out of line with said column of heads, whereby said heads are delivered to said transferring device, as and for the purpose set forth.

43. In a head-feeding device, a raceway adapted to receive a single column of heads, a support for the said column of heads comprising a spring-pressed, cylindrical block provided with a flat upper side, as and for the purpose set forth.

44. In a machine of the class described, a raceway, a spring-pressed lip mounted thereon at the end thereof, a spring-pressed support for the column of heads contained in said raceway, and a head-transferring device adapted to force said support out of the line of travel of the heads in said raceway and to receive therefrom a single head, all combined and arranged as and for the purpose set forth.

45. In a machine of the class described, a plunger-head in combination with a shell-extracting mechanism mounted thereon, said extracting mechanism comprising loosely-mounted, gravity-operated blocks, as and for the purpose set forth.

46. In a cartridge-shell-extracting mechanism, a sleeve provided with oppositely-inclined passages and gravity blocks or pins loosely mounted therein, as and for the purpose set forth.

47. In a shell-extracting mechanism, a sleeve provided with oppositely-inclined passages and gravity-blocks loosely mounted therein, said blocks being beveled upon their opposing faces, as and for the purpose set forth.

48. In a shell-extracting mechanism, a reciprocating sleeve provided with oppositely-inclined passages and blocks loosely mounted to slide therein, said blocks being beveled on their meeting faces and provided with hooks at their lower ends, as and for the purpose set forth.

49. In a shell-extracting mechanism, a reciprocating plunger carrying a sleeve, said sleeve provided with oppositely-inclined passages, blocks loosely mounted to slide in said passages, means for guiding and supporting said blocks, said blocks being beveled on their inner or meeting faces and also on the ends thereof, and provided with hooks or shoulders, as and for the purpose set forth.

50. In a machine of the class described, the combination with a reciprocating, shell-crimping, head-setting and shell-extracting mechanisms and means for operating the same, of shell-feeding mechanism and means for elevating the shells to the crimping mechanism, lowering the shells for the setting operation and again elevating the shells for the action of the extracting mechanism, as and for the purpose set forth.

In witness whereof I have hereunto set my hand this the 10th day of March, 1894, in the presence of two subscribing witnesses.

WILLIAM B. PLACE.

Witnesses:
HIRAM A. BOND,
GRANT SMITH.